United States Patent
Akimoto et al.

[11] Patent Number: 5,934,323
[45] Date of Patent: Aug. 10, 1999

[54] SPOOL

[75] Inventors: Takashi Akimoto; Masamichi Tajima; Makoto Ishikawa, all of Yawara-mura, Japan

[73] Assignee: SMC Corporation, Tokyo, Japan

[21] Appl. No.: 09/028,092

[22] Filed: Feb. 23, 1998

[30] Foreign Application Priority Data

Mar. 21, 1997 [JP] Japan .................................. 9-087624

[51] Int. Cl.$^6$ .............................. F15B 13/04; F16K 3/24
[52] U.S. Cl. ...................... 137/625.69; 251/324; 277/586
[58] Field of Search ....................... 137/625.69; 251/324; 277/586

[56] References Cited

U.S. PATENT DOCUMENTS

| | | | |
|---|---|---|---|
| 5,513,674 | 5/1996 | Frisch ................................ | 137/625.69 |
| 5,609,343 | 3/1997 | Asou et al. . | |

FOREIGN PATENT DOCUMENTS

| | | |
|---|---|---|
| 0 387 150 | 9/1990 | European Pat. Off. . |
| 0 627 582 | 12/1994 | European Pat. Off. . |
| 2 591 705 | 6/1987 | France . |
| 87 05 592 | 7/1987 | Germany . |
| 57-76369 | 5/1982 | Japan .................................. 137/625.69 |
| 7-17892 | 4/1995 | Japan . |
| 2521876 | 10/1996 | Japan . |

*Primary Examiner*—Gerald A. Michalsky
*Attorney, Agent, or Firm*—Oblon, Spivak, McClelland, Maier & Neustadt, P.C.

[57] ABSTRACT

It is an object of this invention to reduce air resistance, which occurs when a packing is mounted in the mounting groove of a spool. Reducing this air resistance facilitates the mounting operation and prevents compressed air from being contained in a groove bottom space, and thus prevents the packing from floating. To achieve this object, a packing mounting groove 14 consisting of a wide portion 14a and a narrow portion 14b is formed in a seal land 13 in the spool. In addition, a packing 11 includes on both sides of its second portion 11b, which is fitted on the narrow portion 14b, a seal lip 18 that contacts the groove wall of the narrow portion 14b in a gas-tight manner such that air is prevented from flowing into the groove bottom. Furthermore, a lip width (f) representing the distance between both seal lips 18 and 18 under a non-seal condition is set the same as or smaller than the width (a) of the wide portion 14a of the mounting groove 14.

8 Claims, 4 Drawing Sheets

SPOOL

FIELD OF THE INVENTION

The present invention relates to a spool built into a spool valve to switch channels.

PRIOR ART

A spool valve generally comprises a bar-like spool inserted into a valve hole into which multiple ports are opened. The spool slides to switch the channels among the ports.

The spool comprises at least one constricted portion forming an air channel and at least one seal land positioned adjacent to the constricted portion. An annular packing which slides across the inner circumferential surface of the valve hole is mounted in a mounting groove annularly cut in the outer circumference of the seal land.

In such a spool, the packing is likely to float to increase sliding resistance or to slip out from the mounting groove. That is, when the spool switches channels, the sliding resistance between the packing and the valve hole's inner circumferential surface or the air pressure acting on the packing causes the packing to be deformed or pulled toward the outer circumference, thereby creating a gap between the packing and the wall of the mounting groove, through which compressed air flows into the space portion (the space at the bottom of the groove) between the inner circumference of the packing and the bottom of the groove. The air presses the packing toward its outer circumference, causing it to float and thereby increasing sliding resistance or causing the packing to slip out from the mounting groove.

To solve this problem, the applicant has proposed several spools that prevent the packing from floating, as disclosed in, for example, Japanese Utility Model Published No. 7-17892 and Japanese Utility Model File No. 2521876. These inventions form a seal lip on both sides of the packing so it can remain in constant contact with the wall of the mounting groove. This prevents compressed air from flowing into the groove bottom space. Thus, the space is closed against the inflow of air and creates a negative pressure that prevents the packing from floating.

In this improved spool, however, when the packing is fitted in the mounting groove, the seal lip moves through the mounting groove toward the bottom while contacting the groove wall to compress the air in the groove. As a result, the air resistance affects the mounting operation, or the compressed air is contained in the groove bottom space.

DISCLOSURE OF THE INVENTION

It is a principle object of this invention to provide a spool that includes packing mounted in a mounting groove and has a seal lip on its sides. The spool reduces air resistance which occurs when the packing is mounted, thereby facilitating the mounting operation; it also prevents compressed air from being contained in the groove bottom space and thus prevents the packing from floating.

It is another object of this invention to provide the above spool to prevent the seal lip from being excessively deformed in order to reliably close the groove bottom space against the inflow of air.

It is yet another object of this invention to provide the above spool in such a way that the packing can be stably and accurately mounted in the mounting groove.

To achieve these objects, this invention provides a spool consisting of a spool body including a packing mounting groove; and a packing mounted in the mounting groove.

The mounting groove has a wide portion closer to its opening and a narrow portion closer to its bottom. On both sides of its second portion fitted on the narrow portion, the packing has a seal lip that is contacted by a seal portion formed on the narrow portion to prevent air from flowing into the bottom. A lip width representing the distance between both seal lips under a non-seal condition is set almost the same as or smaller than the width of the wide portion of the mounting groove.

In the spool having the above configuration according to this invention, the packing is fitted in the mounting groove in a spool body with its diameter extended using a jig. In this case, the seal lip of the packing passes through the wide portion of the mounting groove and contacts the seal portion in the narrow portion in a gas-tight manner. When passing through the wide portion, however, the seal lip does not contact the groove wall or only slightly contacts it and does not provide sufficient gas-tightness to compress the air in the groove, thereby preventing a mounting operation from being affected by the air resistance and also preventing a large amount of compressed air from being contained in the groove bottom space. Thus, this invention enables the packing to be mounted easily and reliably prevents the packing from floating due to air pressure.

According to one specific embodiment, the seal portion consists of parallel groove walls in the narrow portion.

According to another specific embodiment, the seal portion consists of a stage area formed between the narrow portion and the wide portion.

According to this invention, the seal portion is preferably formed at such a position that allows the seal lip to contact the seal portion in a gas-tight manner immediately before the packing has been mounted.

This configuration can reduce the amount of air contained in the groove bottom space by the seal lip, and thus enables the packing to be mounted more reliably and stably.

According to this invention, a seat portion that can support the seal lip from the groove bottom can be formed on the narrow portion of the mounting groove to prevent the seal lip from being excessively deformed and enable the groove bottom space to be reliably closed against the inflow of air.

According to this invention, the packing desirably includes communication grooves allowing the spaces at the groove bottom on both sides of the packing to communicate mutually, at a plurality of positions on its inner circumferential surface that contacts the bottom of the mounting groove.

This configuration enables both sides of the packing to be constantly maintained at the same pressure, thereby preventing the packing from being tilted or deformed and all owing it to be stably and accurately mounted in the mounting groove.

EMBODIMENTS OF THE INVENTION

Figure 1:
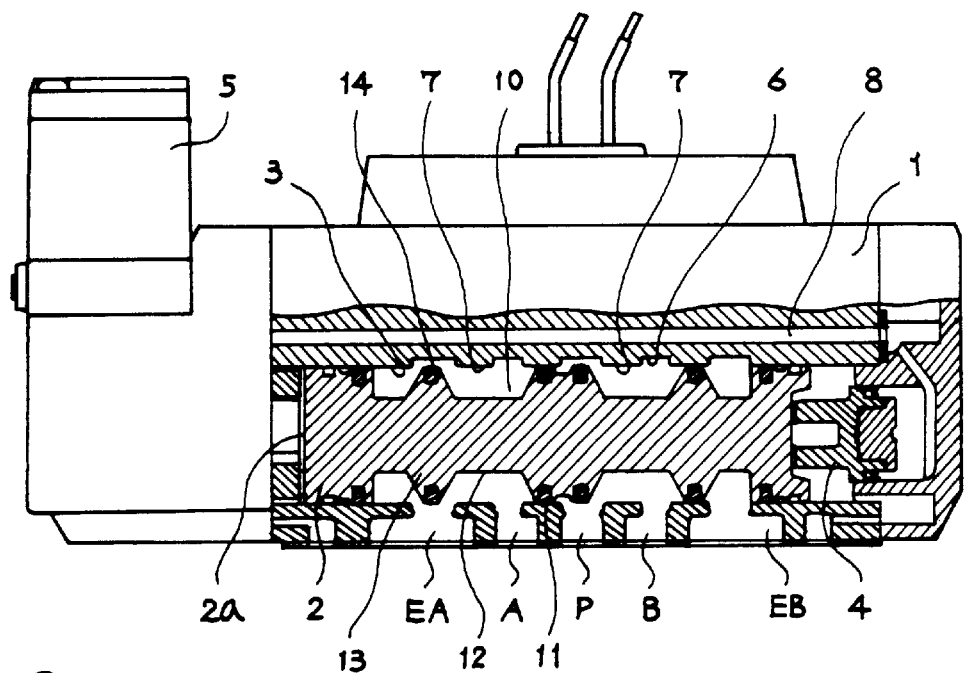
FIG. 1 is a sectional view of an integral part of an example of a spool valve configured using a spool according to this invention.

FIG. 1 shows as an example of a spool valve using a spool according to this invention, a pilot spool valve configured to switch the spool using a single solenoid-operated pilot valve. In this figure, 1 is a valve body; 2 is a spool that slides axially into a valve hole 3 located in the valve body 1; 4 is a return piston disposed at one end of the spool 2 and having a smaller diameter than the spool 2; and 5 is a solenoid-operated pilot valve.

The valve body 1 includes an input port P located at the center; a first and a second output ports A and B located on either side of the input port P; and a first and a second ejection ports EA and EB located on the respective sides of the output ports A and B. An inner circumferential groove 6 into which each of the ports is opened is provided in the wall of the valve hole 3, and a seal surface 7 is formed adjacent to each inner circumferential groove 6.

In addition, the spool 2 includes a bar-like spool body 10 having a plurality of constricted portions 12 forming an air channel, a plurality of seal lands 13 located adjacent to the constricted portions 12, and a packing mounting groove 14 formed on the outer circumference of the seal land 13; and an annular packing 11 mounted and fitted in the mounting groove.

While allowing a pilot air pressure to constantly act on the return piston 4 through a pilot through-hole 8 branching from the input port P, the spool 2 valve of the above configuration uses the pilot valve 5 to supply and eject pilot air pressure to and from an end surface 2a opposed to the spool 2 so as to cause the spool 2 to slide based on the difference between the force of the pilot air pressure acting on the end surface 2a and the force of the pilot air pressure acting on the return piston 4 caused by the difference between their pressure-receiving areas, thereby switching the channel between the ports.

Figure 2:
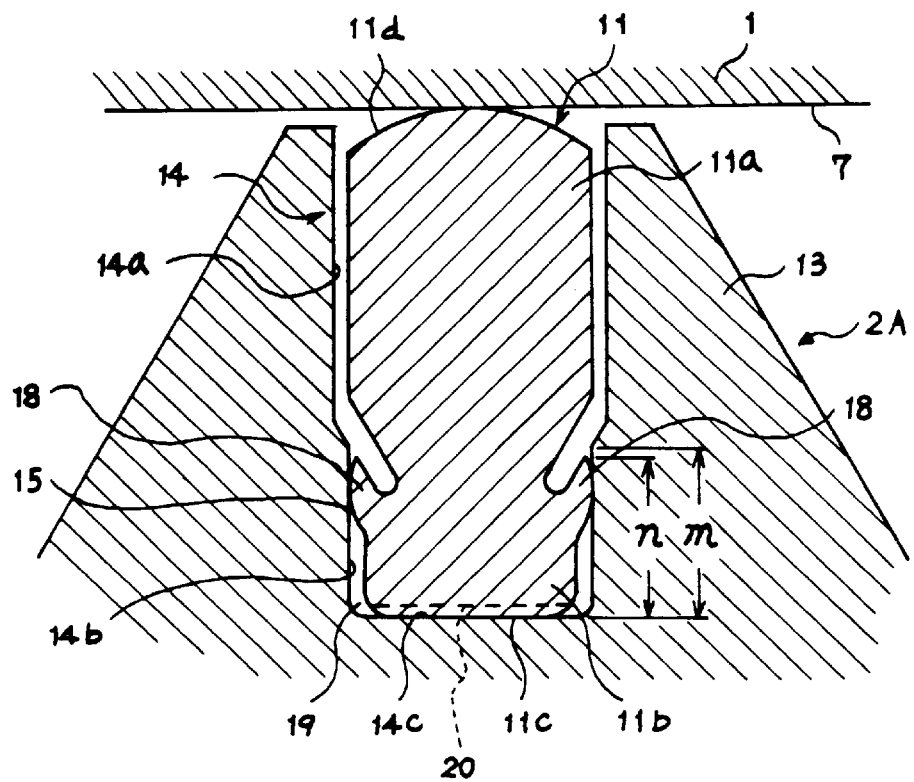
FIG. 2 is a sectional view of an integral part of a first embodiment of the spool according to this invention.

The spool 2 is configured as in each embodiment described below. FIG. 2 shows an enlarged integral part of a spool 2A according to the first embodiment. In the spool 2A, the mounting groove 14 formed in the seal land 13 consists of a wide portion 14a located closer to the groove opening and a narrow portion 14b located closer to the groove bottom; a seal portion 15 that is contacted by a seal lip 18 of the packing 11 is formed on the parallel walls of the narrow portion 14b; and the width (a) of the wide portion 14a is larger than the width (b) of the narrow portion 14b.

Figure 3:
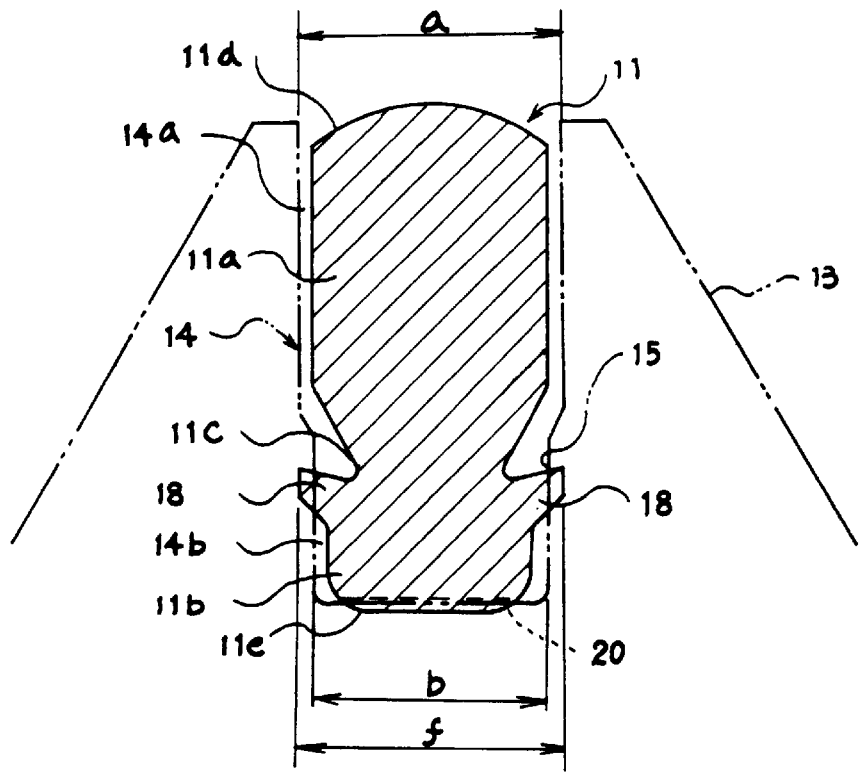
FIG. 3 is a sectional view of a packing used for the spool according to the first embodiment.

As shown in FIG. 3, the packing 11 is formed of an elastic material with sealing characteristics (such as rubber, synthetic rubber, or synthetic resin), and consists of a first portion 11a on the outer circumference that is fitted on the wide portion 14a of the mounting groove 14, a second portion 11b on the inner circumference that is fitted on the narrow portion 14b, and a constricted portion 11c between the first portion 11a and the second portion 11b. The outer circumferential surface 11d of the first portion 11a slides over the seal surface 7 of the valve hole 3 in a gas-tight manner.

In addition, the seal lip 18 that contacts in a gas-tight manner the seal portion 15 provided on the narrow portion 14b is formed on both sides of the second portion 11b. When there is no seal, a lip width (f) representing the distance between both seal lips 18, 18 is approximately equal to or smaller than the width (a) of the wide portion 14a of the mounting groove 14.

The dimensional relationship between the widths (a) and (b) of the wide portion 14a and narrow portion 14b of the mounting groove 14 and the lip width (f) of the packing 11 can be represented as a>b and a=f, or a>f as well as f>b.

The packing 11 is fitted in the mounting groove 14 with its diameter extended using a jig. Once the packing has been mounted, the seal lip 18 contacts the wall (the seal portion 15) of the narrow portion 14b in a gas-tight manner in such a way as to be tilted toward the groove opening. Thus, air from the groove bottom space 19 can flow out because the seal lip 18 is pushed open, whereas air attempting to flow into the groove bottom space 19 is prevented from flowing in because the seal lip 18 is pressed against the seal portion 15. In addition, the packing 11 is somewhat compressed in the radial direction because its inner circumferential surface 11e pressure-contacts the bottom 14c of the mounting groove 14.

Thus, when the spool 2A is switched, if the packing 11 is pulled and starts floating toward its outer circumference due to sliding resistance or air pressure, the packing is prevented from floating because the groove bottom space 19 is sealed against the inflow of air by the seal lip 18 and thus has a negative pressure.

In addition, when the packing 11 is mounted, the seal lip 18 passes through the wide portion 14a of the mounting groove 14 and contacts the narrow portion 14b. Since, however, the lip width (f) is almost the same as or smaller than the width (a) of the wide portion 14a, the seal lip 18 does not contact the wall of the wide portion 14a or only slightly contacts it and does not provide sufficient gas-tightness to compress the air in the groove. This configuration prevents a packing 11 mounting operation from being substantially affected by the air resistance and also prevents a large amount of compressed air from being contained in the groove bottom space 19 to push the packing 11 upward. Thus, this invention enables the packing to be mounted easily and reliably prevents the packing 11 from floating due to the air pressure in the groove bottom space 19.

To reduce the air pressure contained in the groove bottom space 19 by the seal lip 18 and thereby allow the packing 11 to be mounted further reliably and stably, the height (m) of the seal portion 15 relative to the groove bottom 14c (thus, the height of the narrow portion 14b relative to the groove bottom) is set almost the same as or larger than the height (n) of the seal lip 18 relative to the groove bottom 14c in a sealed condition, and the seal lip 18 is best configured to contact the seal portion 15 in a gas-tight manner immediately before the mounting of the packing 11 has been completed.

In addition, it is desirable for the packing 11 to include communicating grooves 20 that allow the groove bottom spaces 19 on both sides of the packing 11 to communicate, at a plurality of positions on its inner circumferential surface 11e that contacts the bottom 14c of the mounting groove 14. This configuration enables both sides of the packing 11 to be maintained at the same constant pressure, thereby preventing the packing 11 from being tilted or deformed due to the difference in pressure and allowing it to be stably and accurately mounted in the mounting groove 14.

Figure 4:
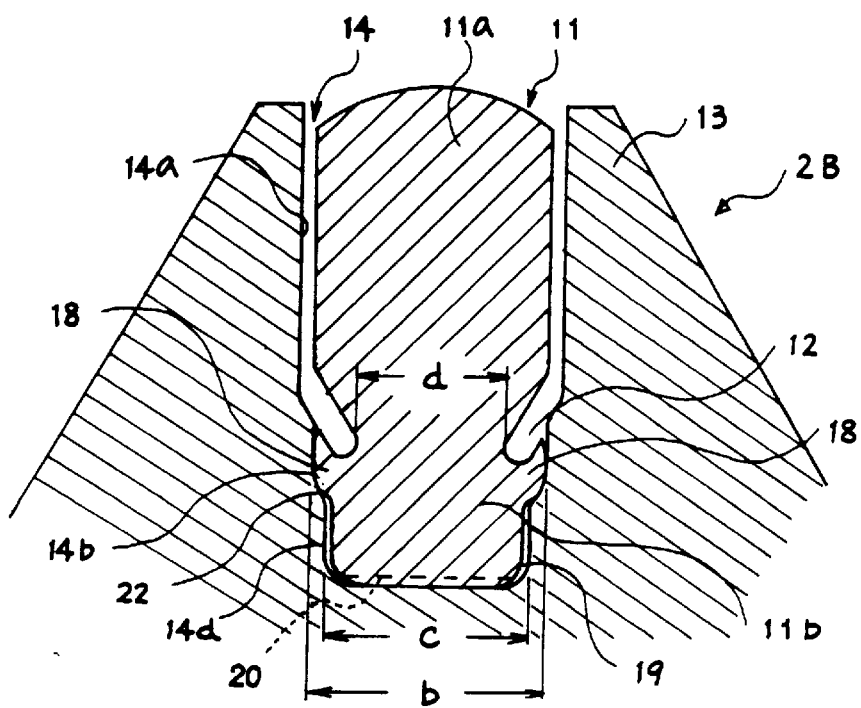
FIG. 4 is a sectional view of an integral part of a second embodiment of the spool.

FIG. 4 shows a second embodiment that differs from the first embodiment in that a seat portion 22 supporting the seal lip 18 from the groove bottom is provided on the narrow portion 14b of the mounting groove 14. That is, a second narrow portion 14d that is narrower than the narrow portion 14b is formed on the groove bottom part of the narrow portion 14b so that the tilted surface between the narrow portion 14b and the second narrow portion 14d can be used as the seat portion 22. The seat portion 22 regulates the excessive deformation of the seal lip 18 to enable the groove bottom space 19 to be reliably closed against the inflow of air.

In the example illustrated, the width (c) of the second narrow portion 14d is larger than the width (d) of the constricted portion 12, but they may be equal or the width (c) may be smaller than the width (d).

The other configuration and preferable variations of this invention are substantially the same as in the first embodiment, so the major components have the same reference numerals and their description is omitted.

Figure 5:
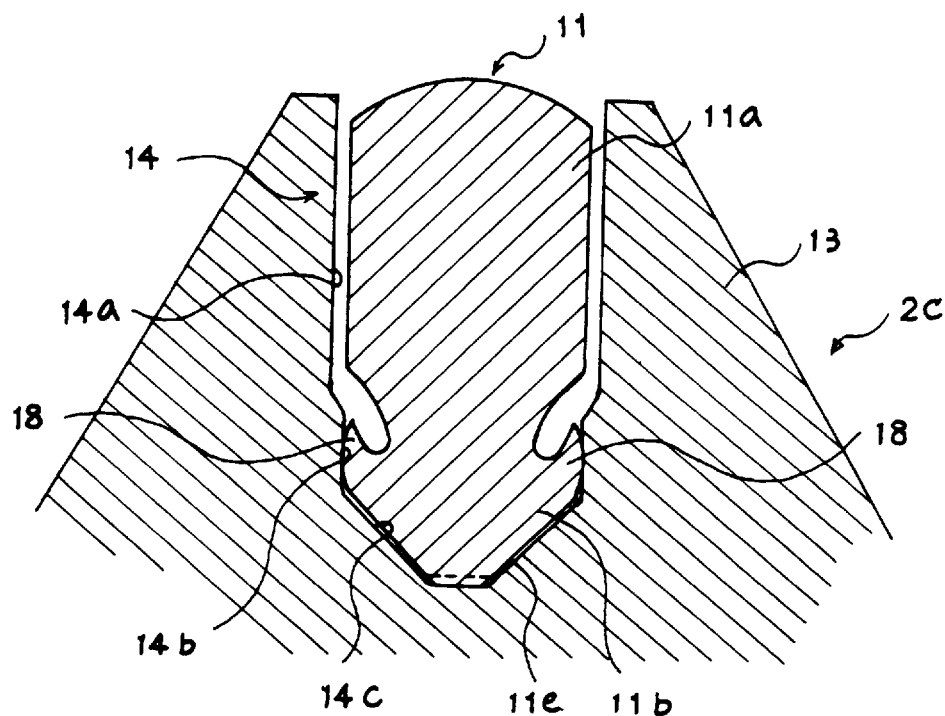
FIG. 5 is a sectional view of an integral part of a third embodiment of the spool.

FIG. 5 shows a third embodiment of this invention. In a spool 2C according to the third embodiment, the bottom 14c of the mounting groove 14 is V-shaped and the inner circumferential surface 11e of the packing 11 is correspondingly V-shaped.

The other configuration and preferable variations of this invention are substantially the same as in the first embodiment, so the major components have the same reference numerals and their description is omitted.

The bottom 14c of the mounting groove 14 and the inner circumferential surface of the packing 11 may be U-shaped instead of being V-shaped.

Figure 6:
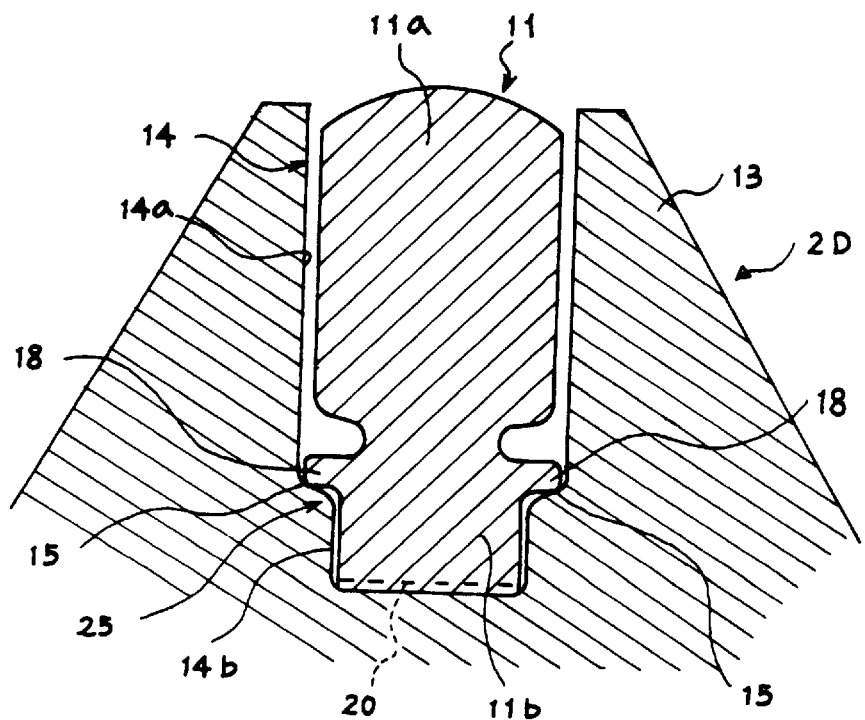
FIG. 6 is a sectional view of an integral part of a fourth embodiment of the spool.

FIG. 6 shows a fourth embodiment. A spool 2D according to the fourth embodiment differs from each of the above embodiments in that the seal portion 15 that is contacted by the seal lip 18 of the packing 11 is formed of a stage portion provided on the narrow portion 14b of the mounting groove 14. That is, a stage portion 25 is formed between the upper end of the narrow portion 14b and the wide portion 14a in such a way that the width of the groove becomes smaller toward its bottom, and the tilted surface of the stage portion 25 is used as the seal portion 15 that is contacted by the tip of the seal lip 18 of the packing 11 in a gas-tight manner.

According to the fourth embodiment, when the packing is mounted, the seal lip 18 does not virtually compress air so the packing can be mounted simply and accurately.

The other configuration and preferable variations of this invention are substantially the same as in the first embodiment, so the major components have the same reference numerals and their description is omitted.

Figure 7:
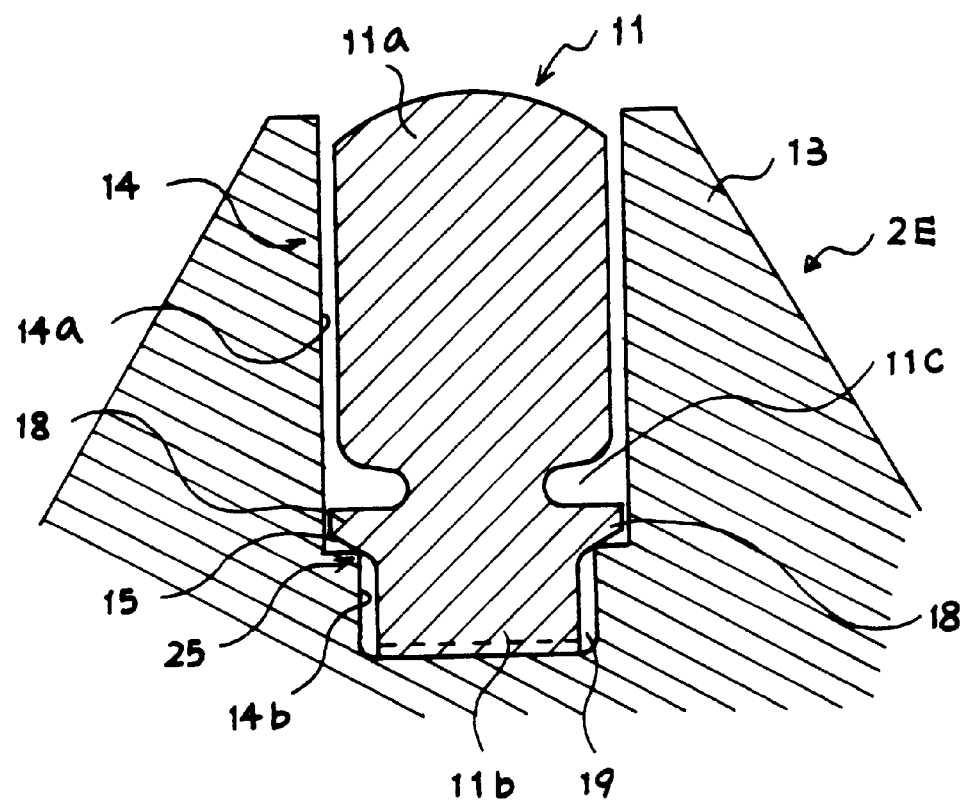
FIG. 7 is a sectional view of an integral part of a fifth embodiment of the spool.

FIG. 7 shows a fifth embodiment of this invention. A spool 2E according to the fifth embodiment differs from the fourth embodiment only in that the square portion of the inner end of the stage portion 25 formed at the upper end of the narrow portion 14b is used as the seal portion 15. The other configuration and preferable variations of this embodiment are substantially the same as in the fourth embodiment, so the major components have the same reference numerals and their description is omitted.

The spool 2 according to this invention is not limited to the above spools having a plurality of constricted portions 12 and a plurality of seal lands 13.

As described above, this invention reduces air resistance occurring when the packing is mounted in order to facilitate the mounting operation and prevents compressed air from being contained in the groove bottom space to prevent the packing from floating due to air pressure.

What is claimed is:

1. A spool with a bar-like spool body having at least one constricted portion forming an air channel, at least one seal land located adjacent to the constricted portions, and a packing mounting groove formed in the seal land in its circumferential direction; and an annular packing mounted and fitted in the mounting groove, wherein:

said mounting groove includes at its opening a wide portion and also includes at its bottom a narrow portion that is narrower than the wide portion, wherein:

said packing includes a first portion that is fitted on the wide portion and a second portion that is fitted on the narrow portion and has on both sides of the second portion a seal lip that contacts a seal portion formed in the narrow portion to prevent air from flowing into the groove bottom, and wherein:

a lip width representing the distance between both seal lips under a non-seal condition is approximately equal to or smaller than the width of the wide portion of the mounting groove.

2. A spool according to claim 1 wherein said seal portion constitutes parallel walls of the narrow portion.

3. A spool according to claim 1 wherein said seal portion is a stage portion between the narrow portion and the wide portion.

4. A spool according to any of claims 1 to 3 wherein said seal portion is formed at a position that is contacted by said seal lip in a gas-tight manner immediately before the mounting of the packing has been completed.

5. A spool according to claim 4 wherein said packing includes communicating grooves allowing the groove bottom spaces on both sides of the packing to communicate, at a plurality of positions on its inner circumferential surface which contacts the bottom of the mounting groove.

6. A spool according to claim 2 wherein a seat portion that can support the seal lip from the groove bottom is formed on the narrow portion of said mounting groove.

7. A spool according to claim 1, 2, 3, or 6 wherein said packing includes communicating grooves allowing the groove bottom spaces on both sides of the packing to communicate, at a plurality of positions on its inner circumferential surface which contacts the bottom of the mounting groove.

8. A spool according to claim 1, wherein said narrow portion defines a lower most portion of said mounting groove.

* * * * *